United States Patent
Laroche et al.

(10) Patent No.: US 12,363,339 B2
(45) Date of Patent: Jul. 15, 2025

(54) METHOD AND APPARATUS FOR ENCODING OR DECODING VIDEO DATA WITH SUB-PIXEL MOTION VECTOR REFINEMENT

(71) Applicant: CANON KABUSHIKI KAISHA, Tokyo (JP)

(72) Inventors: Guillaume Laroche, Saint Aubin d'Aubigne (FR); Patrice Onno, Rennes (FR); Jonathan Taquet, Talensac (FR); Christophe Gisquet, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 18/514,047

(22) Filed: Nov. 20, 2023

(65) Prior Publication Data

US 2024/0089495 A1    Mar. 14, 2024

Related U.S. Application Data

(63) Continuation of application No. 17/833,338, filed on Jun. 6, 2022, now Pat. No. 11,849,142, which is a continuation of application No. 16/627,996, filed as application No. PCT/EP2018/067197 on Jun. 27, 2018, now Pat. No. 11,394,997.

(30) Foreign Application Priority Data

Jul. 4, 2017 (GB) .................................. 1710747

(51) Int. Cl.
*H04N 19/523* (2014.01)
*H04N 19/176* (2014.01)
*H04N 19/56* (2014.01)

(52) U.S. Cl.
CPC .......... *H04N 19/523* (2014.11); *H04N 19/56* (2014.11); *H04N 19/176* (2014.11)

(58) Field of Classification Search
CPC .... H04N 19/176; H04N 19/523; H04N 19/53; H04N 19/533; H04N 19/56
See application file for complete search history.

(56) References Cited

U.S. PATENT DOCUMENTS

| | | | |
|---|---|---|---|
| 2008/0040411 A1* | 2/2008 | Stojancic ............... | H04N 19/61 375/E7.101 |
| 2008/0198934 A1* | 8/2008 | Hong ................... | H04N 19/147 375/E7.113 |
| 2009/0147852 A1* | 6/2009 | Schmit ................... | H04N 19/85 375/240.16 |

(Continued)

*Primary Examiner* — Anner Holder
(74) *Attorney, Agent, or Firm* — Canon U.S.A., Inc. IP Division

(57) ABSTRACT

A method and a device for encoding or decoding video data. It concerns more particularly the encoding according to a particular encoding mode using a decoder side motion vector derivation mode referenced as frame-rate up conversion mode or FRUC mode. In FRUC merge mode, the derivation process comprises a refinement step to increase the accuracy of the obtained motion vector at the sub-pixel level. This process involves the evaluation of different sub-pixel position around the obtained motion vector according to different patterns. The present invention has been devised to improve the known refinement step. It aims at improving the coding efficiency by considering the characteristics of the matching type and/or the signal inside the templates.

5 Claims, 15 Drawing Sheets

(56) References Cited

U.S. PATENT DOCUMENTS

| | | | | |
|---|---|---|---|---|
| 2009/0161770 | A1* | 6/2009 | Dong | H04N 19/159 |
| | | | | 375/E7.193 |
| 2010/0316129 | A1* | 12/2010 | Zhao | H04N 19/53 |
| | | | | 375/E7.125 |
| 2011/0150091 | A1* | 6/2011 | Young | H04N 19/56 |
| | | | | 375/E7.123 |
| 2012/0075535 | A1* | 3/2012 | Van Beek | H04N 5/145 |
| | | | | 348/E5.062 |
| 2013/0251024 | A1* | 9/2013 | Li | H04N 19/56 |
| | | | | 375/E7.076 |
| 2014/0105275 | A1* | 4/2014 | Wang | H04N 19/57 |
| | | | | 375/240.02 |
| 2015/0189306 | A1* | 7/2015 | Li | H04N 19/17 |
| | | | | 375/240.16 |
| 2015/0326888 | A1* | 11/2015 | Jia | H04N 19/87 |
| | | | | 382/236 |
| 2016/0021385 | A1* | 1/2016 | Chou | H04N 19/513 |
| | | | | 375/240.16 |
| 2019/0089976 | A1* | 3/2019 | Huang | H04N 19/176 |

* cited by examiner

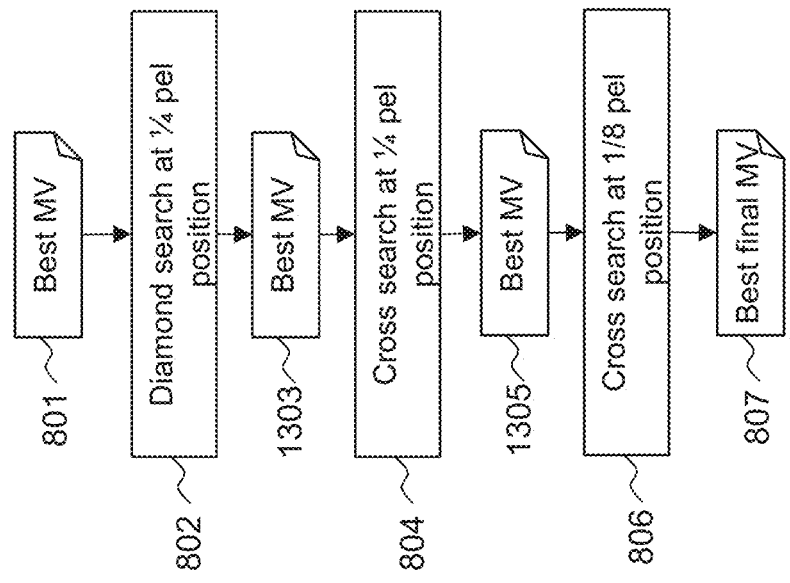
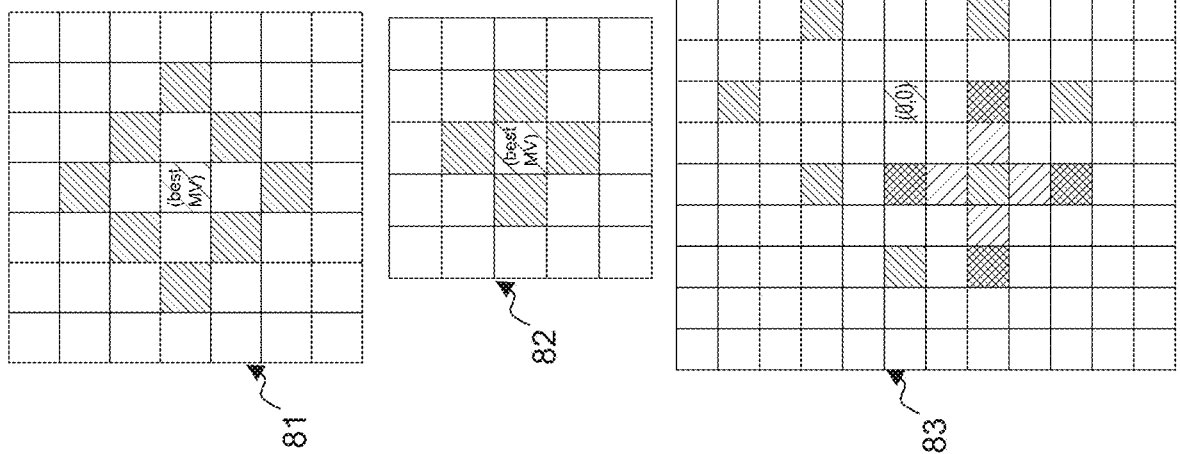
Fig. 8

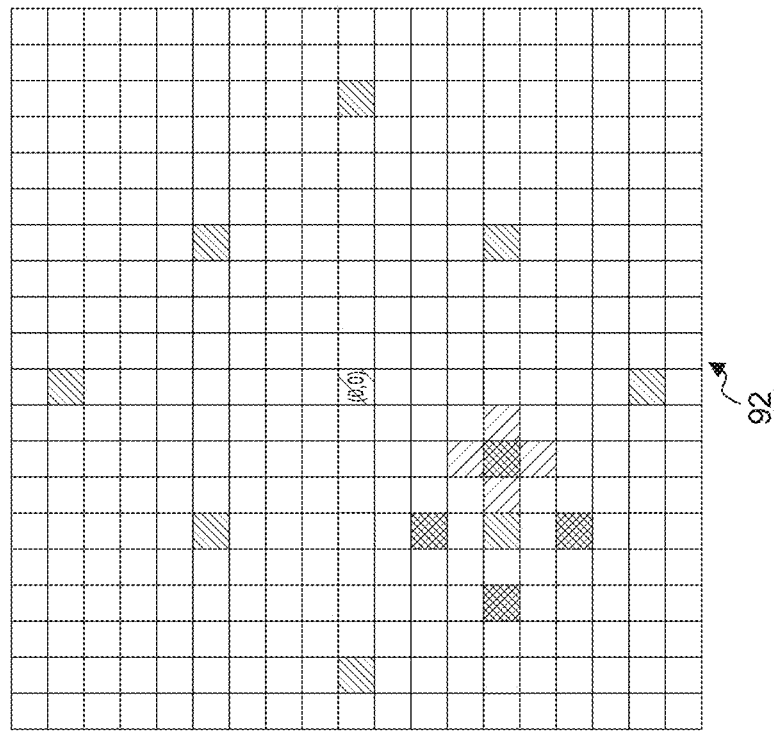
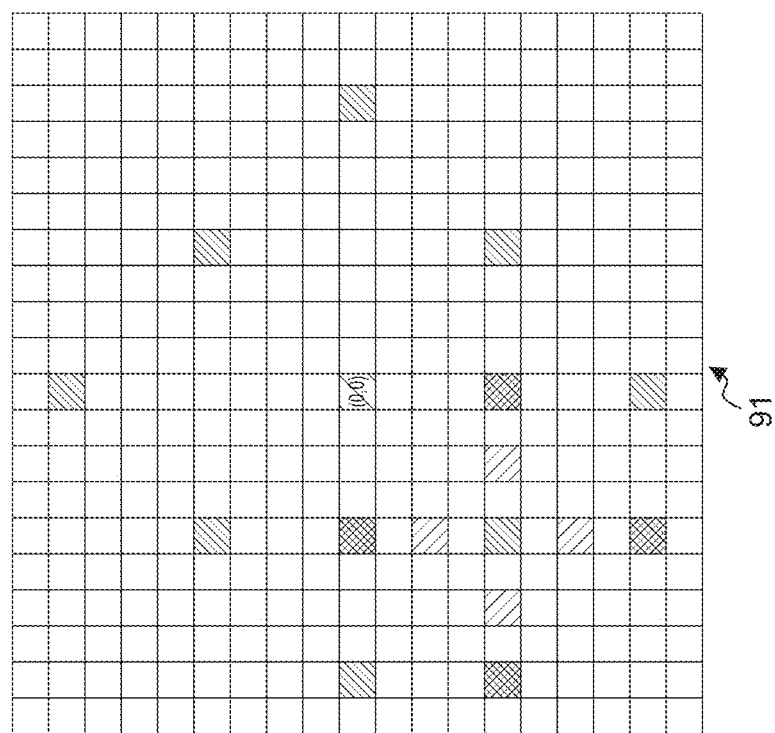
Fig. 9

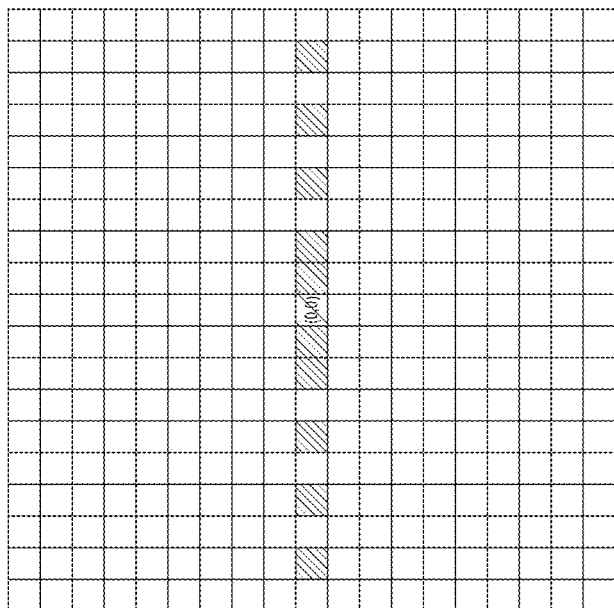
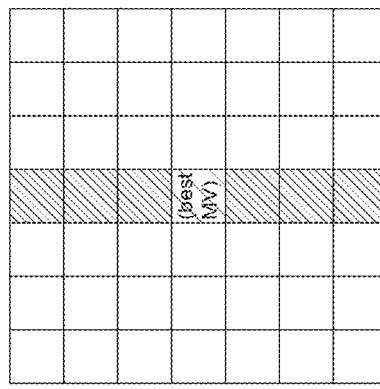
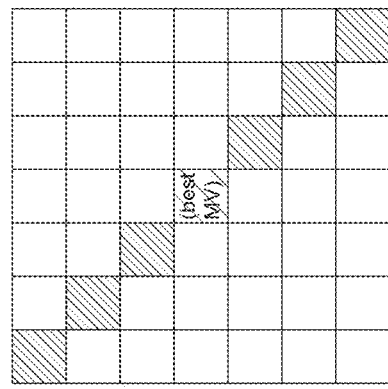
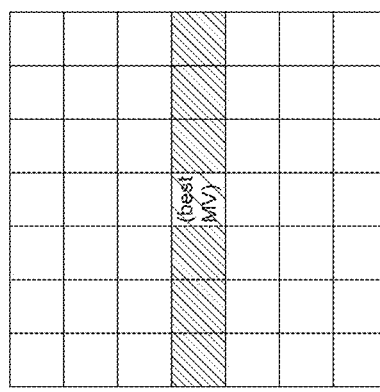
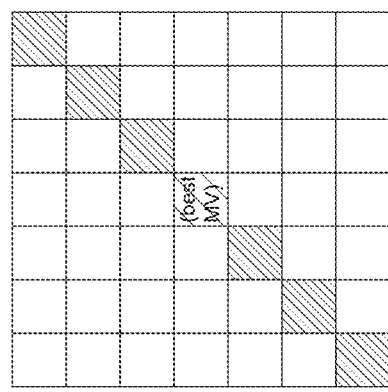
Fig. 11

METHOD AND APPARATUS FOR ENCODING OR DECODING VIDEO DATA WITH SUB-PIXEL MOTION VECTOR REFINEMENT

PRIORITY CLAIM/INCORPORATION BY REFERENCE

This application claims is a continuation of U.S. patent application Ser. No. 17/833,338, filed on Jun. 6, 2022, which is a continuation of U.S. patent application Ser. No. 16/627,996, filed on Dec. 31, 2019, now issued as U.S. Pat. No. 11,394,997 on Jul. 19, 2022, which is a 371 National Stage Application of International Application No. PCT/EP2018/067197, filed on Jun. 27, 2018 the benefit under 35 U.S.C. § 119(a)-(d) of United Kingdom Patent Application No. 1710747.5, filed on Jul. 4, 2017 and entitled "METHOD AND APPARATUS FOR ENCODING OR DECODING VIDEO DATA WITH SUB-PIXEL MOTION VECTOR REFINEMENT". The above cited patent application is incorporated herein by reference in its entirety.

FIELD OF THE INVENTION

The present disclosure concerns a method and a device for encoding or decoding video data. It concerns more particularly the encoding according to a particular encoding mode using a decoder side motion vector derivation mode referenced as frame-rate up conversion mode or FRUC mode.

BACKGROUND OF INVENTION

Predictive encoding of video data is based on the division of frames into blocks of pixels. For each block of pixels, a predictor block is searched in available data. The predictor block may be a block in a reference frame different from the current one in INTER coding modes, or generated from neighbouring pixel in the current frame in INTRA coding modes. Different encoding modes are defined according to different way of determining the predictor block. The result of the encoding is an indication of the predictor block and a residual block consisting in the difference between the block to be encoded and the predictor block.

Regarding INTER coding modes, the indication of the predictor block is a motion vector giving the location in the reference image of the predictor block relatively to the location of the block to be encoded. The motion vector is itself predictively encoded based on a motion vector predictor. The HEVC (High Efficiency Video Coding) standard defines several known encoding modes for predictive encoding of motion vectors, namely the AMVP (Advanced Motion Vector Prediction) mode, the merge derivation process. These modes are based on the construction of a candidate list of motion vector predictor and the signalling of an index of the motion vector predictor in this list to be used for encoding. Typically, a residual motion vector is also signalled.

Recently, a new coding mode regarding the motion vector prediction has been introduced, named FRUC, which defines a decoder side derivation process of the motion vector predictor with no signalling at all. The result of the derivation process is to be used as the motion vector predictor without any transmission of an index or a residual motion vector by the decoder.

In FRUC merge mode, the derivation process comprises a refinement step to increase the accuracy of the obtained motion vector at the sub-pixel level. This process involves the evaluation of different sub-pixel position around the obtained motion vector according to different patterns.

SUMMARY OF THE INVENTION

The present invention has been devised to improve the known refinement step. It aims at improving the coding efficiency by considering the characteristics of the matching type and/or the signal inside the templates.

According to a first aspect of the invention there is provided a method for encoding or decoding video data comprising frames, each frame being split into blocks of pixels, the method comprising for a block of pixels:
  deriving a motion vector list of motion vectors using a mode where motion information is obtained by a decoder side motion vector derivation method;
  evaluating the list of motion vectors to select one motion vector;
  refining the selected motion vector by evaluating motion vectors at sub-pixel positions in the neighbourhood of the selected motion vector; wherein
  at least some sub-pixel positions are selected at a $1/16$ sub-pixel or higher resolution.

In an embodiment, refining the selected motion vector comprises a plurality of search steps; and wherein at least one of these search steps involves sub-pixel positions at a $1/16$ sub-pixel or higher resolution.

In an embodiment, the plurality of search steps comprises at least three successive steps; each of the three successive search steps involves sub-pixel positions at a given resolution; and wherein each given resolution associated with the last two search steps is greater than the given resolution of the previous search step.

In an embodiment, the plurality of search steps comprises at least a search step based on a diamond pattern conducted at a first sub-pixel resolution, and two search steps based on a cross pattern conducted at sub-pixel resolution greater than the first sub-pixel resolution.

In an embodiment, at least some search steps are conducted at a sub-pixel resolution depending on a matching type used to encode the block of pixels.

In an embodiment, a first search step is the search step based on a diamond pattern conducted at $1/4$ sub-pixel resolution; a second search step is a search step based on a cross pattern conducted at $1/8$ sub-pixel resolution; and a third search step is a search step based on a cross pattern conducted at $1/16$ sub-pixel resolution.

According to another aspect of the invention there is provided a method for encoding or decoding video data comprising frames, each frame being split into blocks of pixels, the method comprising for a block of pixels:
  deriving a motion vector list of motion vectors using a mode where motion information is obtained by a decoder side motion vector derivation method;
  evaluating the list of motion vectors to select one motion vector;
  refining the selected motion vector by evaluating motion vectors at sub-pixel positions in the neighbourhood of the selected motion vector; wherein
  sub-pixel positions are evaluated according to at least a pattern selected in a plurality of patterns; and wherein:
  the plurality of patterns comprises a horizontal pattern and a vertical pattern.

In an embodiment, the plurality of patterns further comprises at least a diagonal pattern.

In an embodiment, the pattern in the plurality of patterns is selected based on an edge direction detected in a neighbouring block of pixels.

In an embodiment, at least one of the pattern in the plurality of patterns is defined at a 1/16 sub-pixel or higher resolution.

According to another aspect of the invention there is provided a method for encoding or decoding video data comprising frames, each frame being split into blocks of pixels, the method comprising for a block of pixels:
- deriving a motion vector list of motion vectors using a mode where motion information is obtained by a decoder side motion vector derivation method;
- evaluating the list of motion vectors to select one motion vector;
- determining to refine the selected motion vector by evaluating motion vectors at sub-pixel positions in the neighbourhood of the selected motion vector, based on the signal content of at least a neighbouring block of pixels.

In an embodiment, the signal content is the frequencies in the neighbouring block of pixels.

According to another aspect of the invention there is provided a method for encoding or decoding video data comprising frames, each frame being split into blocks of pixels, the method comprising for a block of pixels:
- deriving a motion vector list of motion vectors using a mode where motion information is obtained by a decoder side motion vector derivation method;
- evaluating the list of motion vectors to select one motion vector; wherein:
- the derivation of the motion vector list of motion vectors is based on templates defined by a pattern of neighbouring pixels of the block of pixels;
- the templates being used for the derivation of the motion vector list of motion vectors are determined based on the content signal of the templates.

In an embodiment, the signal content is the frequencies in the templates.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

According to another aspect of the invention there is provided a decoder device for decoding video data comprising frames, each frame being split into blocks of pixels, the decoder device comprising a processor configured for decoding a block of pixels by:
- deriving a motion vector list of motion vectors using a mode where motion information is obtained by a decoder side motion vector derivation method;
- evaluating the list of motion vectors to select one motion vector;
- refining the selected motion vector by evaluating motion vectors at sub-pixel positions in the neighbourhood of the selected motion vector; wherein
- at least some sub-pixel positions are selected at a 1/16 sub-pixel or higher resolution.

According to another aspect of the invention there is provided a decoder device for decoding video data comprising frames, each frame being split into blocks of pixels, the decoder device comprising a processor configured for decoding a block of pixels by:
- deriving a motion vector list of motion vectors using a mode where motion information is obtained by a decoder side motion vector derivation method;
- evaluating the list of motion vectors to select one motion vector;
- refining the selected motion vector by evaluating motion vectors at sub-pixel positions in the neighbourhood of the selected motion vector; wherein
- sub-pixel positions are evaluated according to at least a pattern selected in a plurality of patterns; and wherein:
- the plurality of patterns comprises a horizontal pattern and a vertical pattern.

According to another aspect of the invention there is provided a decoder device for decoding video data comprising frames, each frame being split into blocks of pixels, the decoder device comprising a processor configured for decoding a block of pixels by:
- deriving a motion vector list of motion vectors using a mode where motion information is obtained by a decoder side motion vector derivation method;
- evaluating the list of motion vectors to select one motion vector;
- determining to refine the selected motion vector by evaluating motion vectors at sub-pixel positions in the neighbourhood of the selected motion vector, based on the signal content of at least a neighbouring block of pixels.

According to another aspect of the invention there is provided a decoder device for decoding video data comprising frames, each frame being split into blocks of pixels, the decoder device comprising a processor configured for decoding a block of pixels by:
- deriving a motion vector list of motion vectors using a mode where motion information is obtained by a decoder side motion vector derivation method;
- evaluating the list of motion vectors to select one motion vector; wherein:
- the derivation of the motion vector list of motion vectors is based on templates defined by a pattern of neighbouring pixels of the block of pixels;
- the templates being used for the derivation of the motion vector list of motion vectors are determined based on the content signal of the templates.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 8 illustrates the motion vector refinement;

FIG. 9 illustrates the adaptive sub-pixel resolution for motion vector refinement in an embodiment of the invention;

FIG. 11 illustrates some motion vector refinement search shapes used in one embodiment of the invention;

DETAILED DESCRIPTION OF THE INVENTION

Figure 1:
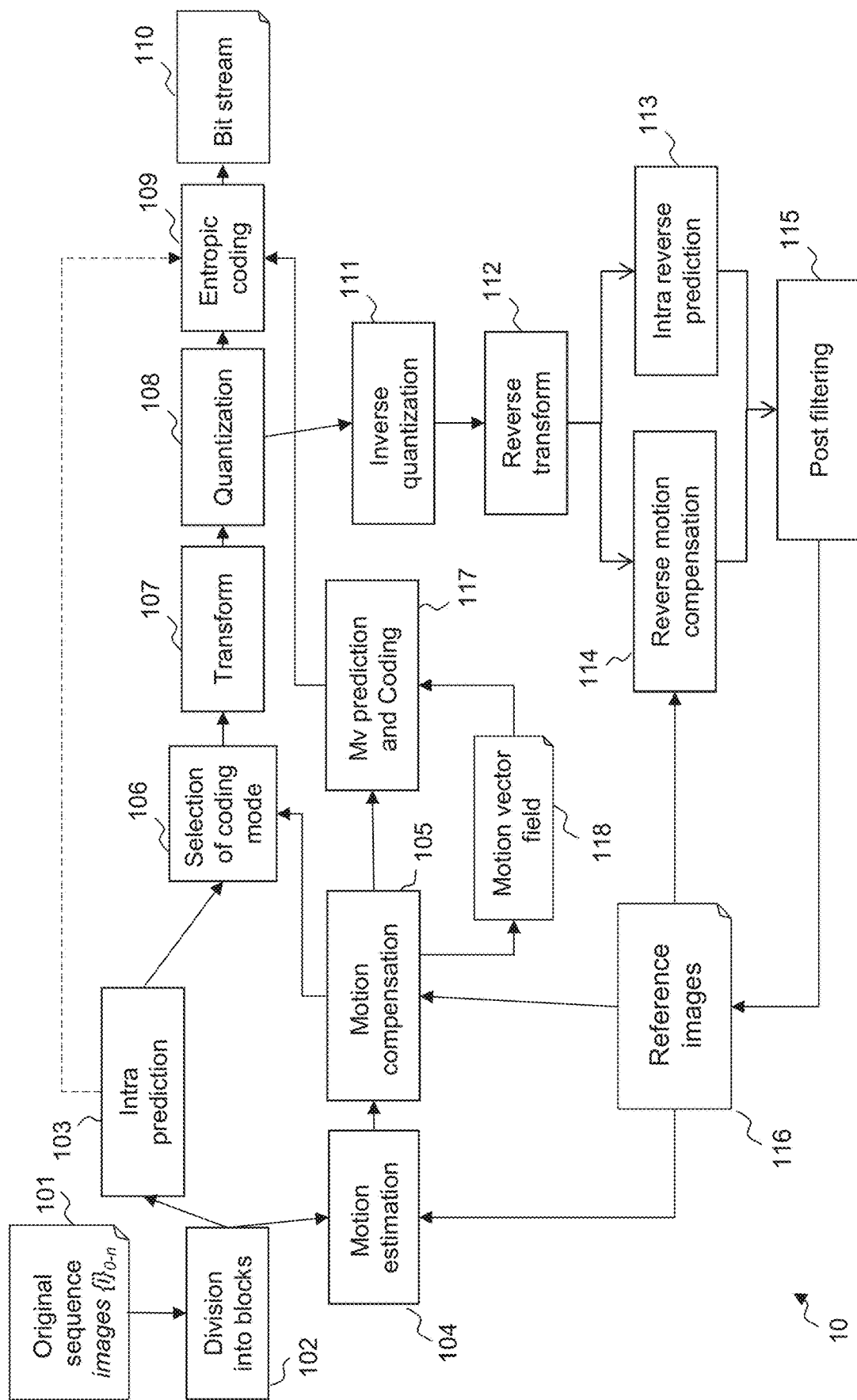
FIG. 1 illustrates the HEVC encoder architecture.

FIG. 1 illustrates the HEVC encoder architecture. In the video encoder, an original sequence 101 is divided into blocks of pixels 102 called coding units. A coding mode is then affected to each block. There are two families of coding modes typically used in HEVC: the modes based on spatial prediction or INTRA modes 103 and the modes based on temporal prediction or INTER modes based on motion estimation 104 and motion compensation 105. An INTRA Coding Unit is generally predicted from the encoded pixels at its causal boundary by a process called INTRA prediction.

Temporal prediction first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

Then, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the encoded and decoded loop. It means that they need to be applied on the reconstructed frame at encoder and decoder side in order to use the same reference frame at encoder and decoder side. The aim of this post filtering is to remove compression artefacts.

Figure 2:
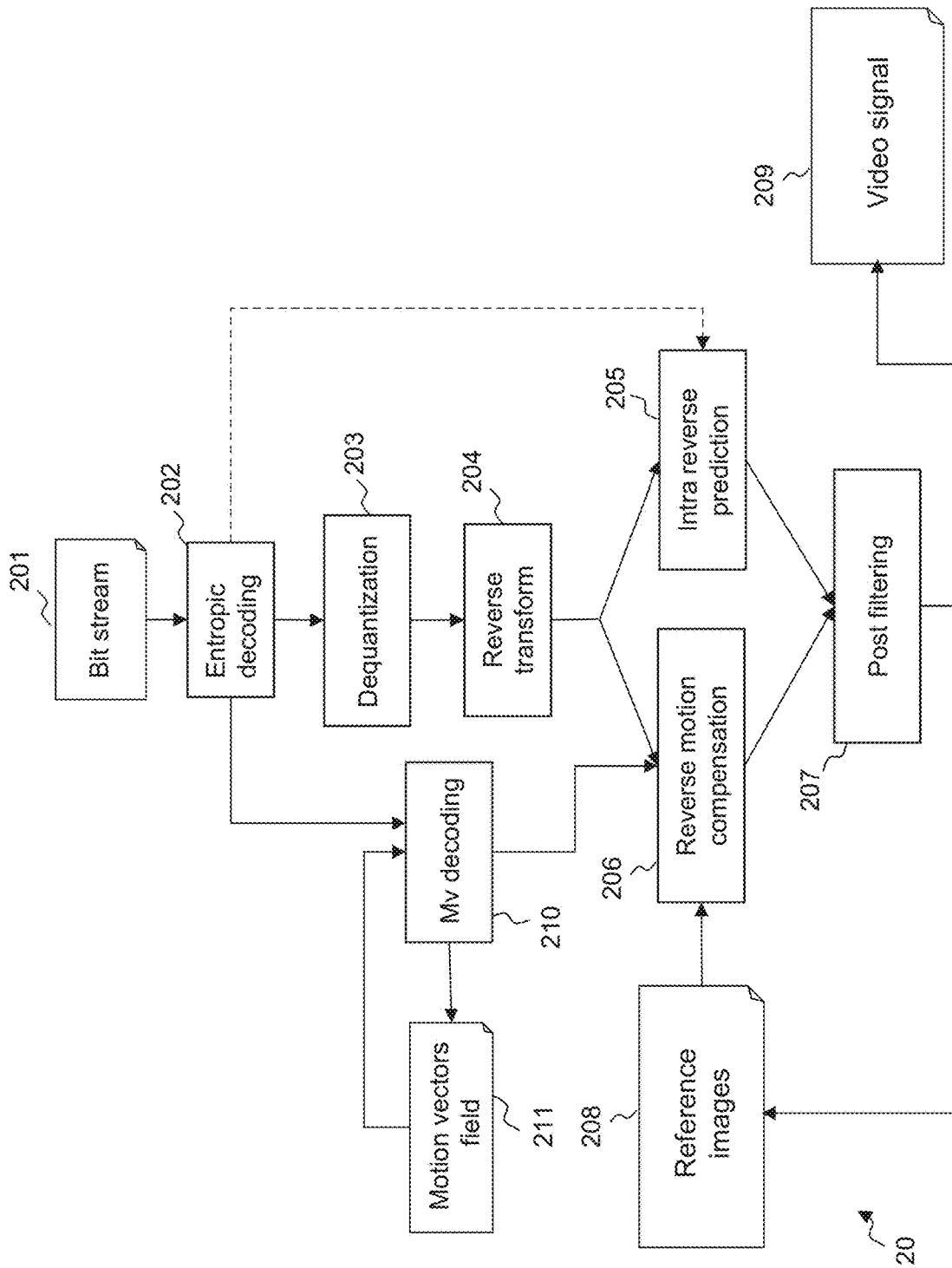
FIG. 2 illustrates the principle of a decoder.

In FIG. 2, have been represented the principle of a decoder. The video stream 201 is first entropy decoded in a module 202. The residual data are then inverse quantized in a module 203 and inverse transformed in a module 204 to obtain pixel values. The mode data are also entropy decoded in function of the mode, an INTRA type decoding or an INTER type decoding is performed. In the case of INTRA mode, an INTRA predictor is determined in function of the INTRA prediction mode specified in the bitstream 205. If the mode is INTER, the motion information is extracted from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

The HEVC standard uses 3 different INTER modes: the Inter mode, the Merge mode and the Merge Skip mode. The main difference between these modes is the data signalling in the bitstream. For the Motion vector coding, the current HEVC standard includes a competitive based scheme for Motion vector prediction compared to its predecessors. It means that several candidates are competing with the rate distortion criterion at encoder side in order to find the best motion vector predictor or the best motion information for respectively the Inter or the Merge mode. An index corresponding to the best predictors or the best candidate of the motion information is inserted in the bitstream. The decoder can derive the same set of predictors or candidates and uses the best one according to the decoded index.

The design of the derivation of predictors and candidates is very important to achieve the best coding efficiency without large impact on complexity. In HEVC two motion vector derivations are used: one for Inter mode (Advanced Motion Vector Prediction (AMVP)) and one for Merge modes (Merge derivation process).

As already mentioned, a candidate of Merge modes ("classical" or Skip) represents all the motion information: direction, list, and reference frame index and motion vectors. Several candidates are generated by the Merge derivation process described in the following, each have an index. In the current HEVC design the maximum candidate for both Merge modes is equal to 5.

Figure 3:
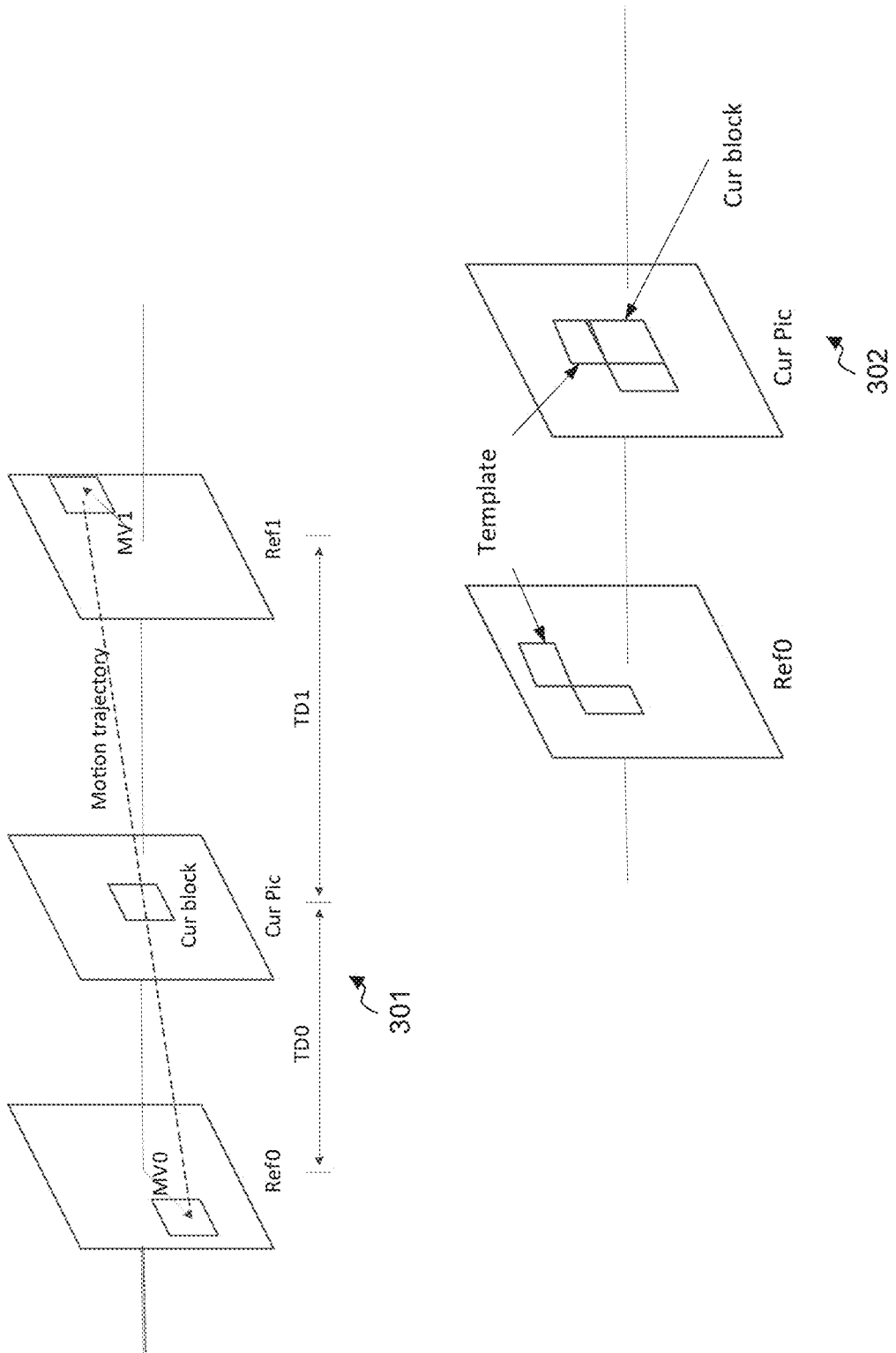
FIG. 3 illustrates the template matching and the bilateral matching in FRUC merge mode.

Two types of search are possible with the current version of the JEM: the template matching and the bilateral matching. FIG. 3 illustrates these two methods. The principle of the bilateral matching 301 is to find the best match between two blocks, also called templates sometimes by analogy with the template matching described below, along the motion trajectory of the current coding unit.

The principle of the template matching 302 is to derive the motion information of the current coding unit by computing the match cost between the reconstructed pixels around the current block and the neighboring pixels around the block pointed by the evaluated motion vector. The template corresponds to a pattern of neighbouring pixels around the current block and to the corresponding pattern of neighbouring pixels around the predictor block.

For both matching types (template or bilateral), the different matches cost computed are compared to find the best one. The motion vector or the couple of motion vectors that obtain the best match is selected as derived motion information. Further details can be found in JVET-F1001.

Both Matching methods offer the possibility to derive the entire motion information, motion vector, reference frame, type of prediction. The motion information derivation at decoder side, noted "FRUC" in the JEM, is applied for all HEVC inter modes: AMVP, Merge and Merge Skip.

For AMVP all the motion information is signalled: uni or bi prediction, reference frame index, predictors index motion vector and the residual motion vector, the FRUC method is applied to determine a new predictor which is set at the first predictor if the list of predictor. So it has the index 0.

For Merge and Merge Skip mode, a FRUC flag is signalled for a CU. When the FRUC flag is false, a merge index is signalled and the regular merge mode is used. When the FRUC flag is true, an additional FRUC mode flag is signalled to indicate which method (bilateral matching or template matching) is to be used to derive motion information for the block. Please note that the bilateral matching is applied only for B frames and not for P frames.

For Merge and Merge Skip mode, a motion vector field is defined for the current block. It means that a vector is defined for a sub-coding unit smaller than the current coding unit. Moreover, as for the classical Merge one Motion vector for each list can form the motion information for a block.

Figure 4:
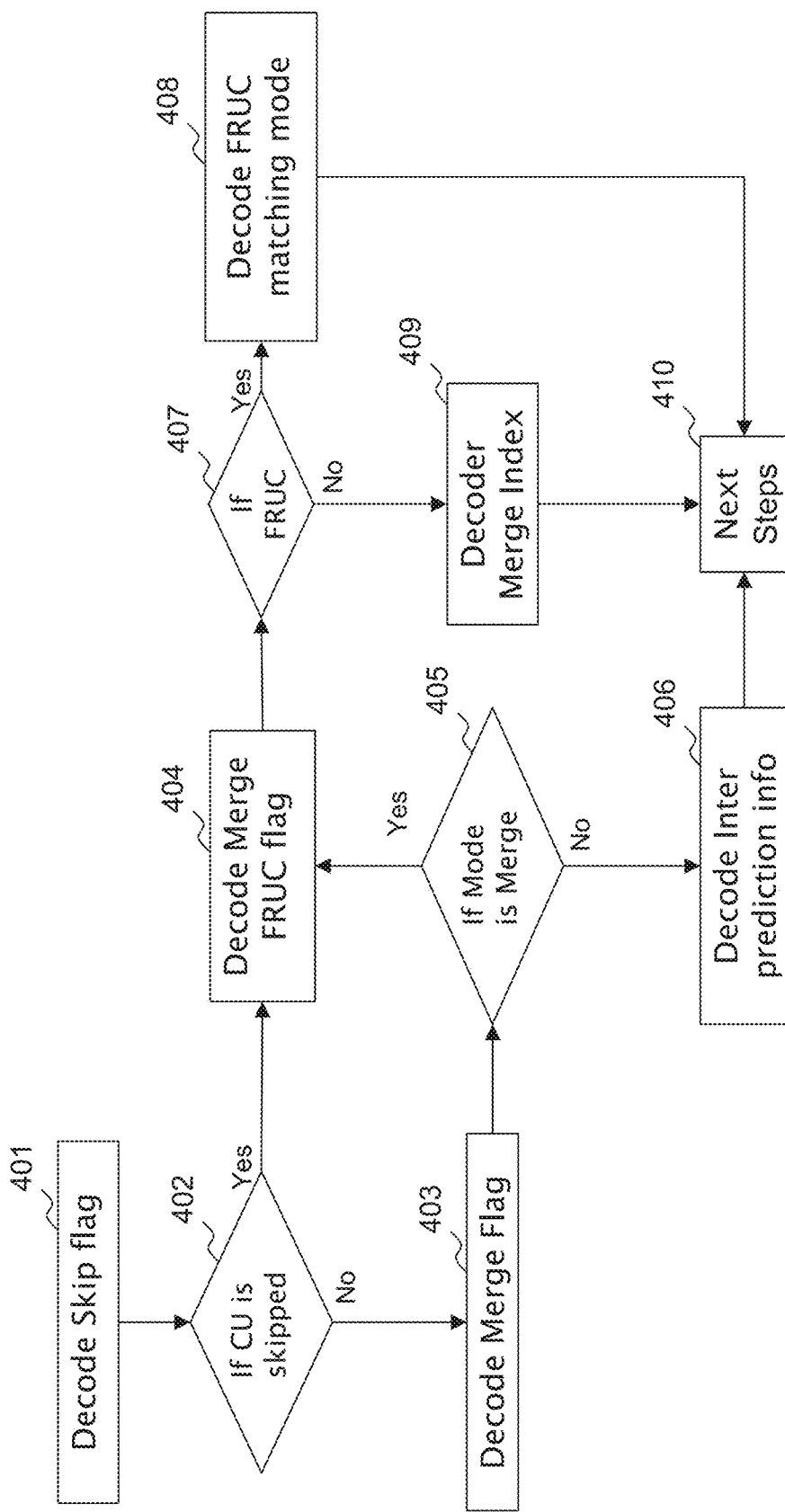
FIG. 4 illustrates the decoding of the FRUC Merge information.

FIG. 4 is a flow chart which illustrates this signaling of FRUC flag for the Merge modes for a block. A block can be a coding unit or a prediction unit according to the HEVC wording.

In a first step 401, the Skip flag is decoded to know if the coding unit is encoded according to the Skip mode. If this flag is false, tested in step 402, the Merge Flag is then decoded in a step 403 and tested in a step 405. When the coding unit is encoded according to Skip or Merge mode, the Merge FRUC flag is decoded in a step 404. When the coding unit is not encoded according to Skip or Merge mode, the intra prediction info of the classical AMVP inter modes are decoded in a step 406. When the FRUC flag of the current coding unit is true, tested in a step 407, and if the current slice is a B slice, the matching mode flag is decoded in a step 408. It should be noted that bilateral matching in FRUC is only available for B slices. If the slice is not a B slice and FRUC is selected, the mode is necessarily template matching and the matching mode flag is not present. If the coding unit is not FRUC the classical Merge index is then decoded in a step 409.

Figure 5:
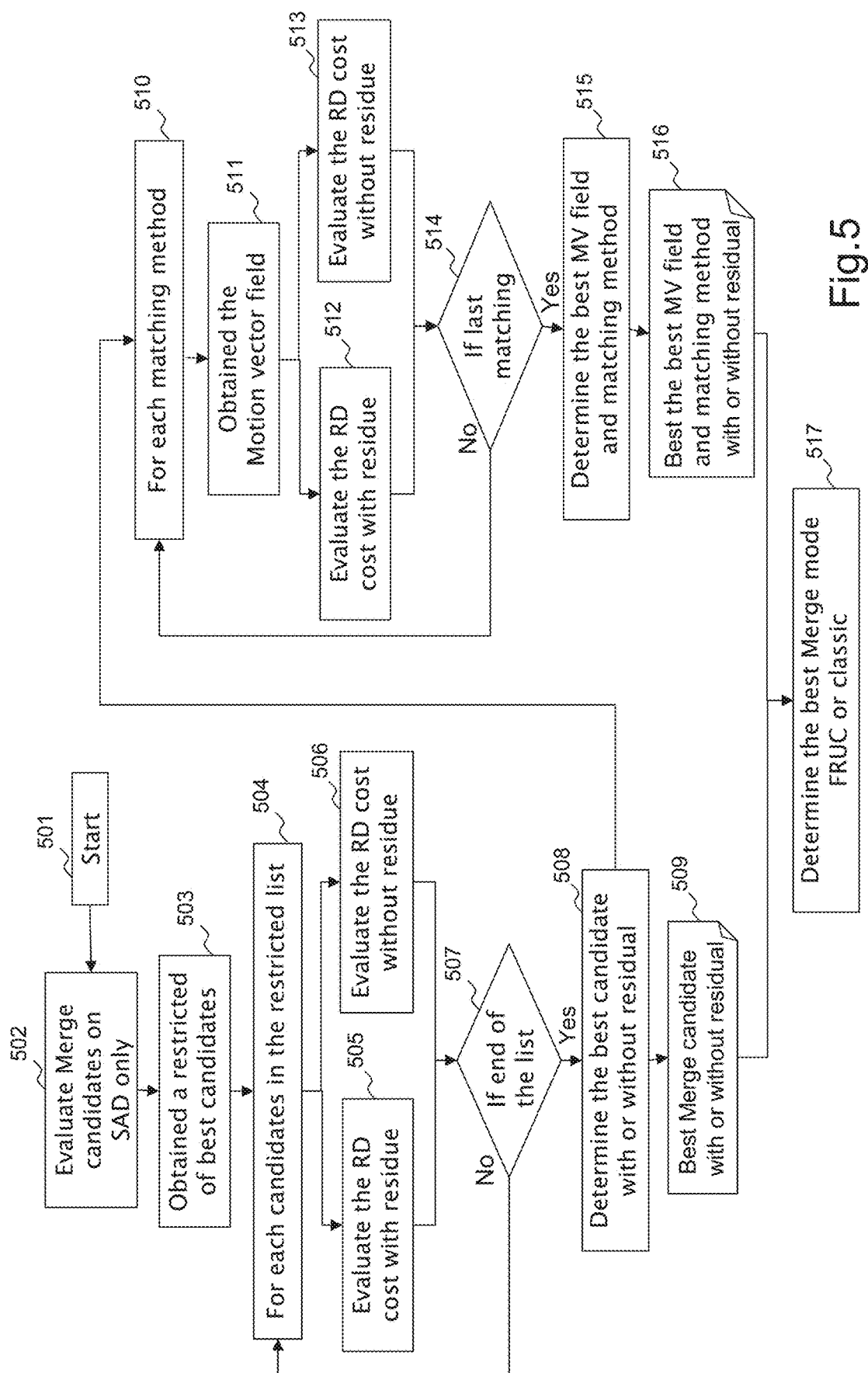
FIG. 5 illustrates the encoder evaluation of the Merge mode and the Merge FRUC mode.

The FRUC Merge mode is competing at encoder side with the classical Merge mode (and other possible Merge). FIG. 5 illustrates the current encoding mode evaluation method in the JEM. First the classical Merge mode of HEVC is evaluated in a step 501. The candidate list is first evaluated with simple SAD (Sum of Absolute Difference) between the original block and each candidates of the list in a step 502. Then a real rate distortion (RD) cost of each candidates of a list of restricted candidates, illustrated by steps 504 to 508, is evaluated. In the evaluation, the rate distortion with a residual, step 505, and a rate distortion without a residual, step 506, are evaluated. At the end, the best merge candidate is determined in step 509, this best merge candidate may have a residual or not.

Then the FRUC Merge mode is evaluated in steps 510 to 516. For each matching method, step 510, namely the bilateral and template matching, the motion vector field for the current block is obtained in a step 511 and full rate distortion cost evaluations with and without a residual are computed in steps 512 and 513. The best motion vector 516, with or without residual, is determined in step 515 based on these rate distortion costs. Finally, the best mode between the classical Merge mode and the FRUC Merge mode is determined in step 517 before possible evaluation of other modes.

Figure 6:
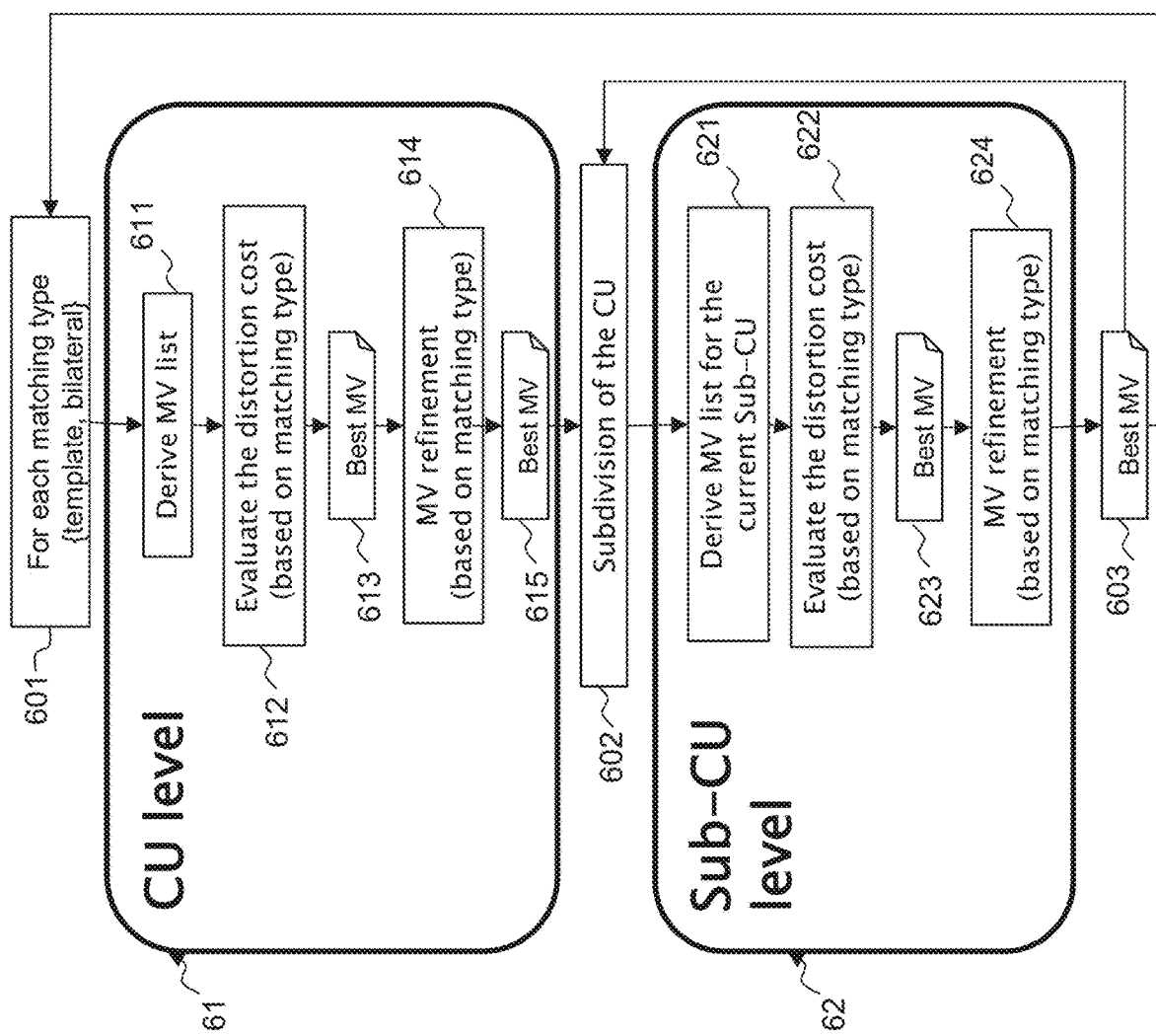
FIG. 6 illustrates the Merge FRUC mode derivation at coding unit and Sub-coding unit levels of the JEM.

FIG. 6 illustrates the FRUC Merge evaluation method at encoder side. For each matching type, step 601, namely the template matching type and the bilateral one, the coding unit level is first evaluated by module 61, followed by the sub-coding unit level evaluation by module 62. The goal is to find a motion information for each sub-coding unit in the current coding unit 603.

Module 61 handles the coding unit level evaluation. A list of motion information is derived in step 611. For each motion information in this list the distortion cost is computed and compared with each other in step 612. The best motion vector for template or best couple for bilateral 613 are those which minimize the cost. Then a motion vector refinement step 614 is applied to improve this accuracy of the obtained motion vector. With FRUC method, a bilinear interpolation is used instead of the classical Discrete Cosine Transform Interpolation Filter (DCTIF) interpolation filter for the template matching estimation. This offers a reduction of the memory access around the block to only one pixel instead of the 7 pixels around the block for the traditional DCTIF. Indeed the bilinear interpolation filter needs only 2 pixels to obtain the sub-pixel value for one direction.

After the motion vector refinement, a better motion vector for the current coding unit is obtained in step 615. This motion vector will be used for the sub-coding unit level evaluation.

The current coding unit is subdivided into several sub-coding unit in step 602. A sub-coding unit is a square block which depends on the splitting depth of the coding unit in the quad tree structure. The minimum size is 4×4.

For each sub-CU, the sub-CU level evaluation module 62 evaluates a best motion vector. A motion vector list is derived in step 621 including the best motion vector obtained at CU level in step 615. For each motion vector the distortion cost is evaluated in step 622. But the cost also comprises a cost representing the distance between the best motion vector obtained at coding unit level and the current motion vector to avoid a divergent motion vector field. The best motion vector 623 is obtained based on the minimal cost. This vector 623 is then refined with the MV refinement process 624 in the same way as done at CU level in step 614.

At the end of the process, for one matching type, a motion information is for each sub-CU is obtained. At encoder side the best RD cost between both matching types are compared to select the best one. At decoder side this information is decoded from the bitstream (in step 408 of FIG. 4).

Figure 7:
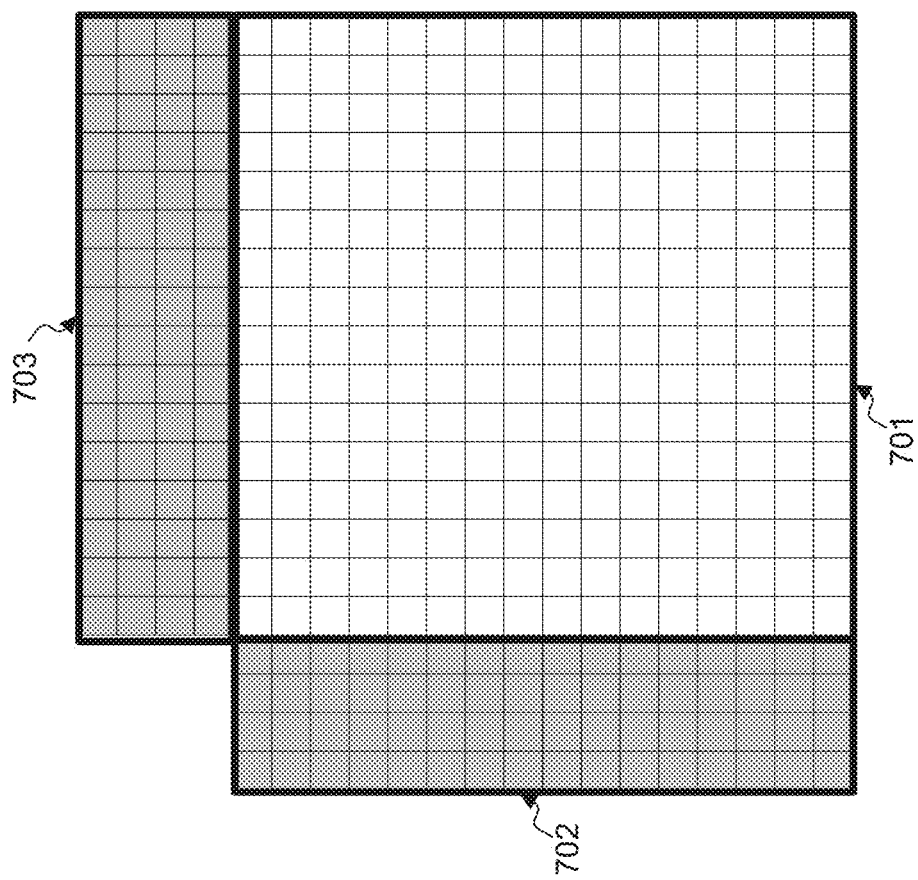
FIG. 7 illustrates the template around the current block for the JEM template matching method.

For template FRUC matching mode, the template 702, 703 comprises 4 lines up to the block and 4 rows left to the block 701 used to estimate the rate distortion cost as depicted in grey in FIG. 7. Two distinct templates are used, namely the left template 702 and the up template 703. The current block or the matched block 701 is not used to determine the distortion.

FIG. 8 illustrates the motion vector refinement step 614 and 624 in FIG. 6 by an additional search around the best predictor identified (613 or 623).

The method takes as input the best motion vector predictor 801 identified in the list (612 or 622).

In a step 802, a diamond search is applied at a resolution corresponding to ¼ pixel positions. This diamond search is based on a diamond pattern that is illustrated by diagram 81, at the ¼ pixel resolution, centered on the best vector motion. This step results in a new best motion vector 803 at the ¼ pixel resolution.

The best obtained motion vector position 803 of this diamond search becomes the center of a cross search, meaning based on a cross pattern, at resolution ¼ pixel in a step 804. This cross search pattern is illustrated by diagram 82, at the ¼ pixel resolution, centered on the best vector motion 803. This step results in a new best motion vector 805 at the ¼ pixel resolution.

The new best motion vector position 805 obtained with this search step 804 becomes the center for a cross search at resolution ⅛ pixel in step 806. This step results in a new best motion vector 807 at ⅛ pixel resolution. Diagram 83 illustrates, at the ⅛ resolution, these three search step patterns with all the positions tested.

The present invention has been devised to improve the known refinement step. It aims at improving the coding efficiency by considering the characteristics of the matching type and/or the signal inside the templates.

In one embodiment of the invention, the sub-pixel refinement precision is increased at each step of the refinement method.

Refinement steps are conducted by evaluating motion vectors at sub-pixel positions. The sub-pixel positions are determined at a given sub-pixel resolution. The sub-pixel resolution determines the number of sub-pixel positions between two pixels. The higher is the resolution, the higher is the number of sub-pixel positions between two pixels. For example, a ⅛ pixel resolution corresponds to 8 sub-pixel positions between two pixels.

FIG. 9 illustrates this embodiment. In a first diagram 91 is illustrated at a 1/16 pixel resolution the prior art patterns as described in FIG. 8. As depicted in the example of diagram 92, the first step remains a diamond search at ¼th pixel, then the cross search is at $8^{th}$ pixel and the last cross search is at $1/16^{th}$ pixel. This embodiment offers the possibility to obtain more accurate positions around a good position. Moreover, the motion vector is in average closer to the initial position than the previous sub-restriction.

In one additional embodiment, the refinement is applied only for template matching and not for bilateral matching.

Figure 10:
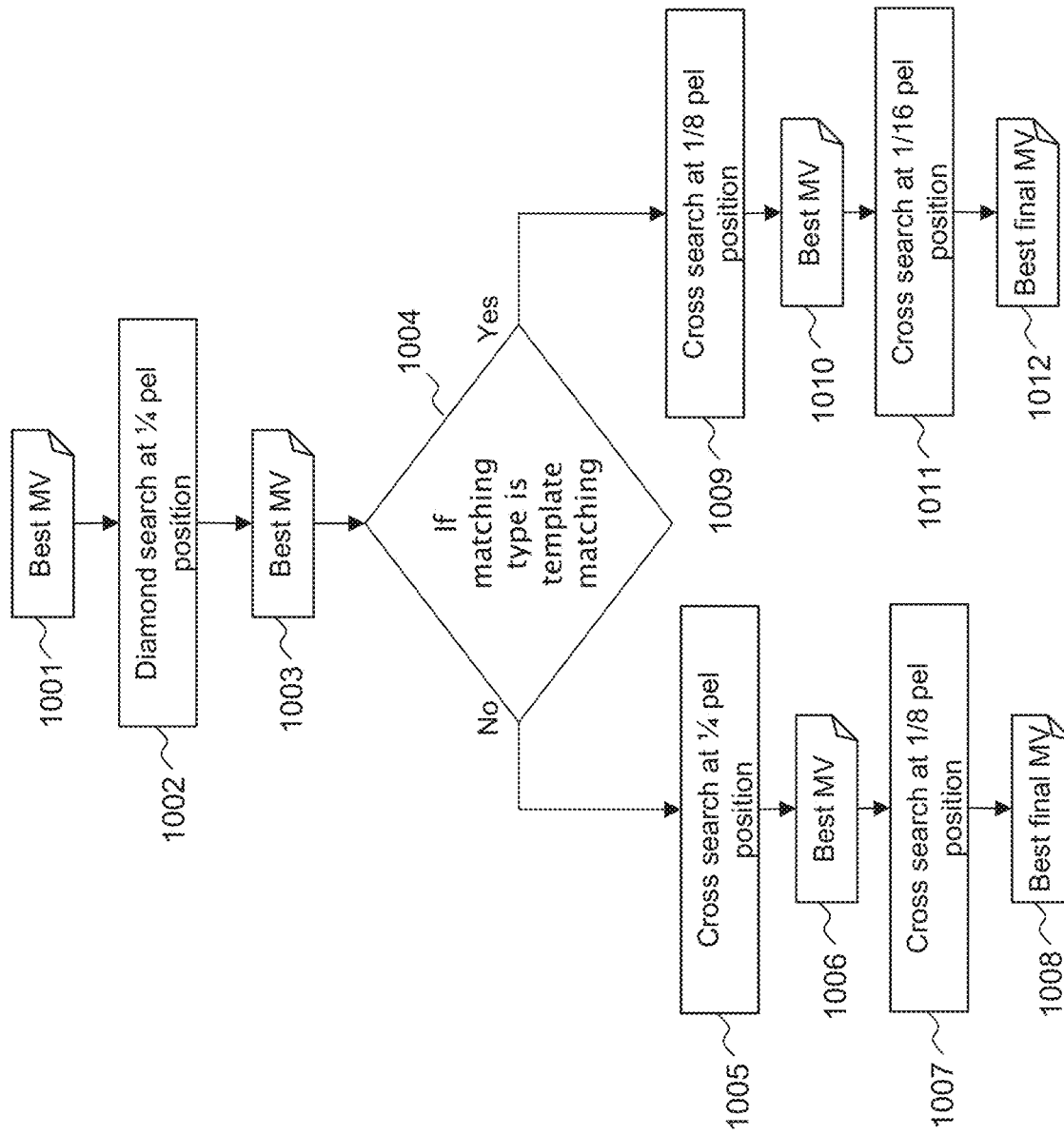
FIG. 10 gives an example of results obtained with the prior art and one embodiment of the invention.

FIG. 10 is a flow chart representing these embodiments. The best motion vector 1001 corresponding to the best motion vector (613 or 623) obtained with the previous steps is set as the center position of the diamond search 1002 at ¼ pel position. The diamond search 1002 results in a new best motion vector 1003. The matching type is tested in step 1004. If the matching type is template matching the motion vector 1003 obtained with the diamond search is the center of the cross search 1009 at the $1/8^{th}$ pixel precision resulting in new best motion vector 1010. This new best motion vector 1010 is subjected to a cross search 1011 at $1/16^{th}$ pixel precision to obtain the final best motion vector 1012.

If the matching type is not template matching, then the regular cross search at ¼ pixel is done in step 1005 to result in a new best motion vector 1006, followed by a ⅛ pixel search step 1007 to get the final best motion vector 1008.

This embodiment improves the coding efficiency especially for uni-prediction. For bi-prediction, the averaging between two similar blocks is sometimes similar to an increase of the sub-pixel resolution. For example, if both blocks for bi-prediction come from the same reference frame and the difference between their two motion vectors is equal to the lower sub-pixel resolution, the bi-prediction corresponds in that case to an increase of the sub-pixel resolution. For uni-prediction this additional averaging between two blocks doesn't exist. Consequently, it is more important to increase the sub-pixel resolution for uni-prediction especially when this higher resolution doesn't need to be signaled in the bitstream.

In one embodiment, the diamond or the cross search patterns are replaced by horizontal, diagonal or vertical patterns. FIG. 11 illustrates various diagrams that may be used in this embodiment. Diagram 1101 illustrates the positions searched according to a ⅛ pixels horizontal pattern. Diagram 1102 illustrates the positions searched according to a ⅛ pixels vertical pattern. Diagram 1103 illustrates the positions searched according to a ⅛ pixels diagonal pattern. Diagram 1104 illustrates the positions searched according to another ⅛ pixels diagonal pattern. Diagram 1105 illustrates the positions searched according to a 1/16 pixels horizontal pattern.

A horizontal pattern is a pattern of sub-pixel positions aligned horizontally. A vertical pattern is a pattern of sub-pixel positions aligned vertically. A diagonal pattern is a pattern of sub-pixel positions aligned diagonally.

The advantage of these patterns is mainly interesting when the block contains an edge because it offers a better refinement of this edge for the prediction. Indeed, in the classical motion vector estimation, the refinement of the motion vector gives higher results when additional positions tested are selected among the perpendicular axis of the detected edge.

Figure 12:
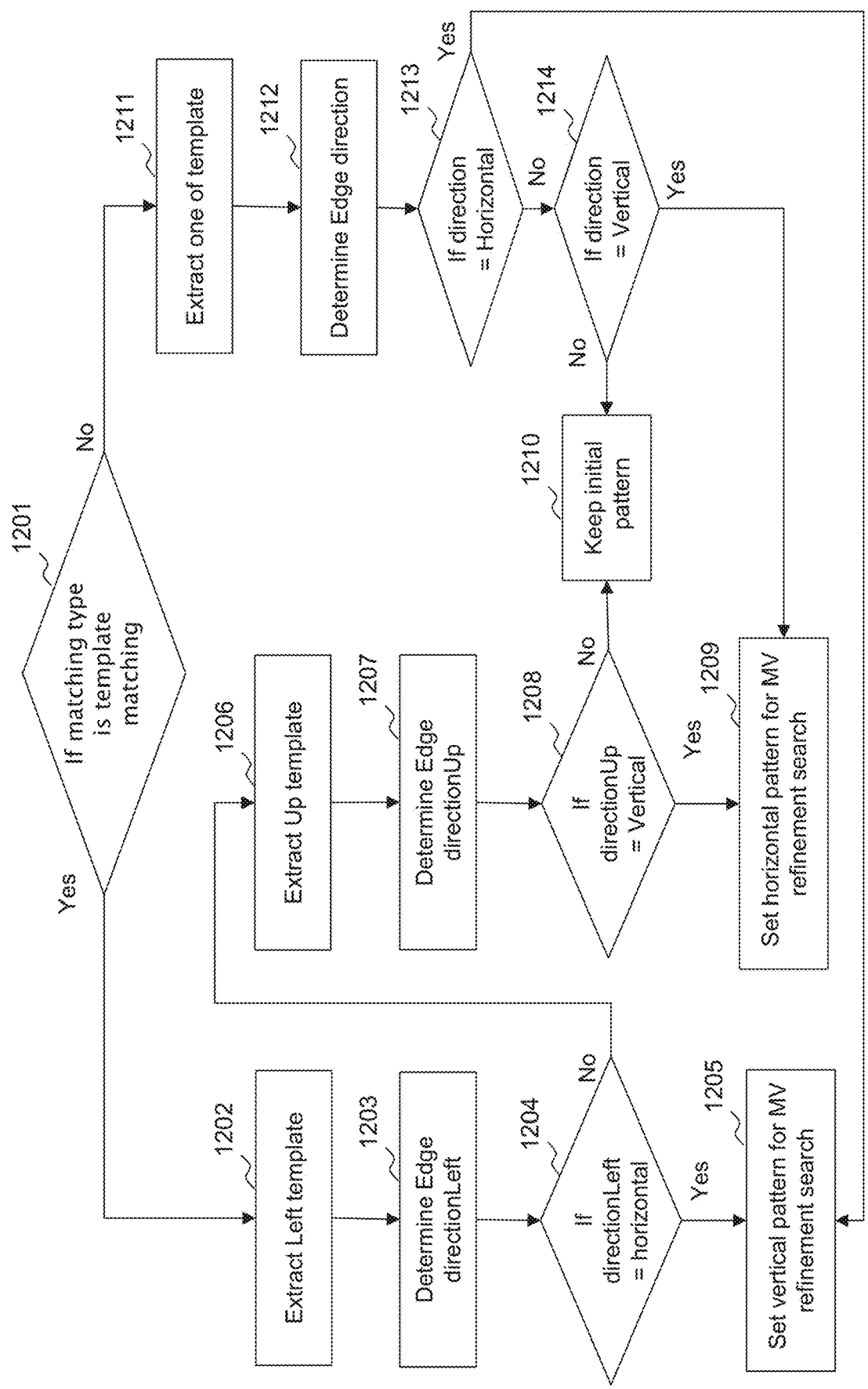
FIG. 12 illustrates the adaptive search shapes for the motion vector refinement of one embodiment of the invention.

FIG. 12 gives an example of a method to select a pattern according to this embodiment. This flow chart can be used to change for example one or more pattern searches of modules 802, 804, 806 in FIG. 8. When the matching type is the template matching, tested in step 1201, the left template of the current block is extracted in a step 1202. It is then determined if the block contains an edge or not. If it exists, the direction of the edge is determined in a step 1203. For example, the gradient on the current block can be computed to determine the existence of an edge and its direction. If this "directionLeft" is horizontal the pattern, tested in a step 1204, a vertical pattern, for example pattern 1102, is selected for the motion vector refinement in a step 1205.

If there is no edge in the left template, or if the direction identified is not horizontal, the up template of the current block is extracted in a step 1206. It is determined if the template contains an edge and if it exists, the direction is then determined in a step 1207. If this "directionUp" is vertical, tested in step 1208, the pattern selected for the motion vector refinement in step 1209 is the horizontal pattern, for example pattern 1101 or 1105. Otherwise, the initial pattern (81, 82, 83) is selected in a step 1210.

Please note that if the left block contains a horizontal edge, this edge should go through the current block. In the same way if the up block contains a vertical edge, this edge should go through the current block. On contrary, if the left block contains a vertical edge, this edge should not go through the current block etc. . . . . .

If the matching type is determined in step 1201 to be bilateral matching, then one template block is selected in a step 1211. Then it is determined in a step 1212 if the template contains a direction and which direction it is. If this direction is horizontal, tested in step 1213, the vertical pattern is selected in step 1205. If the direction is vertical, tested in step 1214, the horizontal pattern is selected in step 1209. For bilateral matching, some other linear patterns can be used as the diagonal patterns 1103 and 1104. In that case, the linear pattern which is the most perpendicular to the direction of the edge, determined in 1212, is selected. If no edge is detected in step 1212, the initial pattern is kept.

The advantages of this adaption of the patterns for the motion vector refinement is a coding efficiency improvement because the pattern is adapted to the signal contained inside the templates.

The pattern can also be adapted. For example, diagram 1105 shows a horizontal pattern in $1/16^{th}$ pixel precision where more positions have been concentrated around the initial motion vector position with a high motion vector precision.

In one embodiment, the signal content of the templates is used to determine the number of positions tested for motion vector refinement. For example, the presence of high frequencies in templates around the current block is used to determine the application of the refinement step. The reason is that in absence of sufficient high frequencies, a sub-pixel refinement of the motion vector is not relevant.

Figure 13:
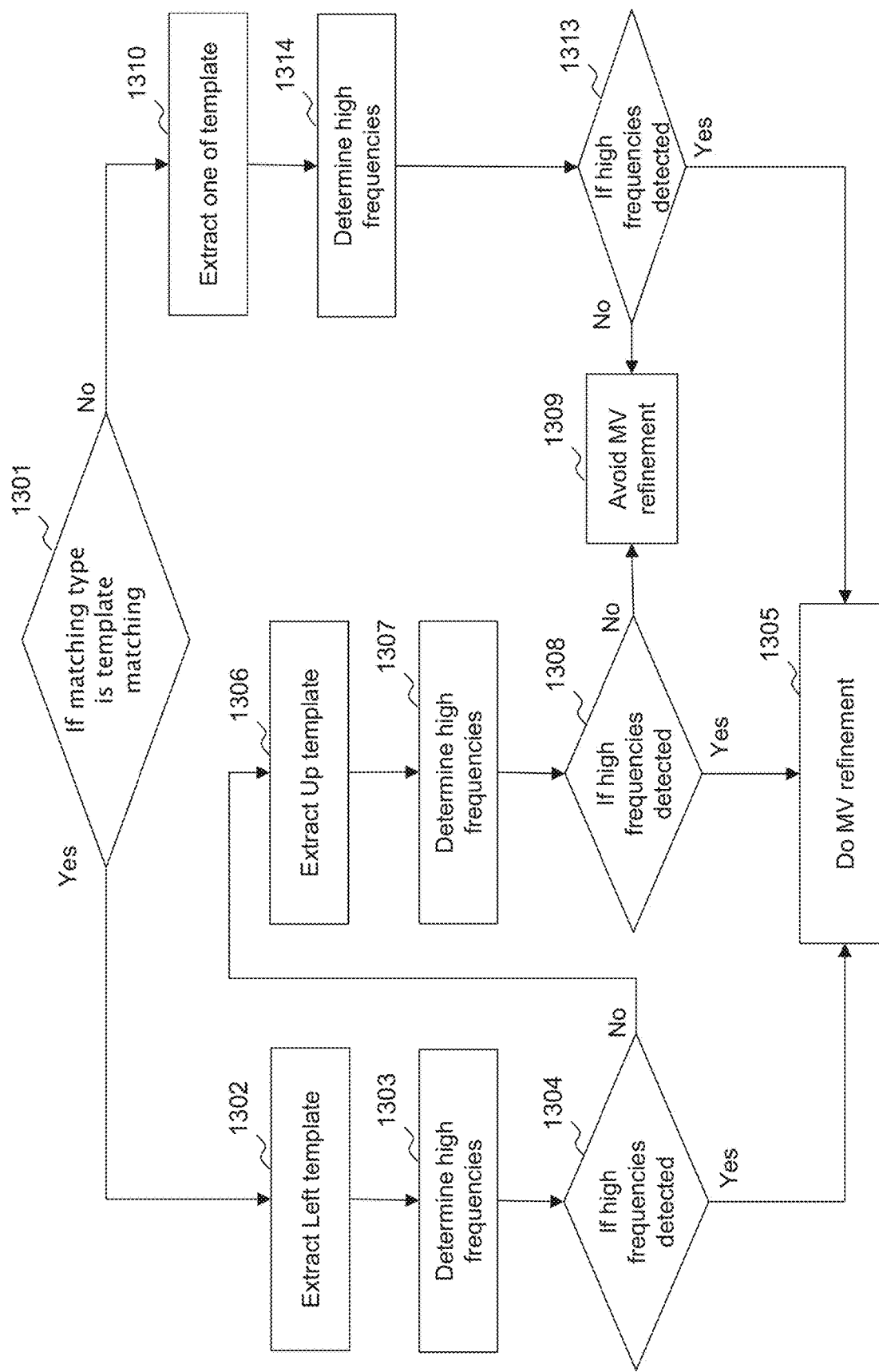
FIG. 13 illustrates the adaptive motion vector refinement of one embodiment of the invention.

FIG. 13 gives an example of this embodiment.

If the matching mode is the template matching tested in step 1301, the left template, typically the neighboring 4 rows of the current block, is extracted in step 1302. Then it is determined if this block contains high frequencies in step 1303. This determination can be obtained, for example, by comparing a sum of gradients to a threshold. If this left template contains high frequencies, tested in step 1304, the motion vector refinement step 1305, corresponding to steps 614 and 624 of FIG. 6, is applied.

If this left template doesn't contain enough high frequencies, the up template is extracted in step 1306. It is determined in step 1307 if the extracted template contains high frequencies. If it is the case, tested in step 1308, the motion vector refinement step is applied in step 1305. Otherwise the motion vector refinement step is skipped in step 1309.

If the matching type is determined to be the bilateral matching in step 1301, one template is extracted in step 1310. Then it is determined if the extracted template contains high frequencies in step 1314. If the extracted template does not contain high frequencies, tested in step 1313, the motion vector refinement is not applied in step 1309, otherwise it is applied in step 1305.

In yet another embodiment, the signal content of the templates is used to determine the templates to be used for the distortion estimation used to determine the motion vector for template matching type FRUC evaluation.

Figure 14:
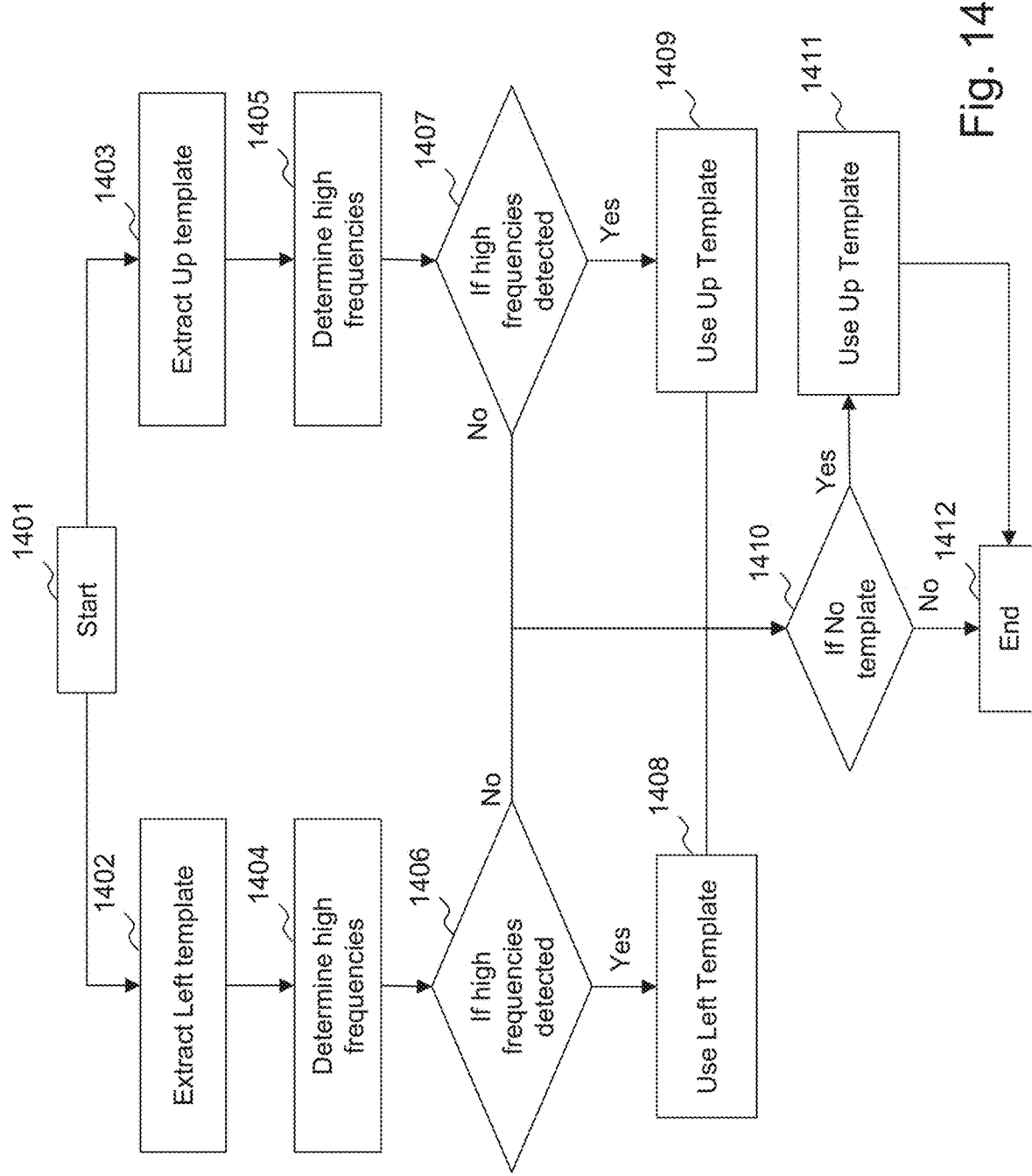
FIG. 14 illustrates the template selection for the motion vector refinement of one embodiment of the invention.

FIG. 14 illustrates this embodiment.

The process starts with step 1401. The left template and the up template are extracted in steps 1402 and 1403. For each extracted template, it is determined if the extracted template contains high frequencies in steps 1404 and 1405. If the tested templates contain high frequencies, tested in steps 1406 and 1407, they are used for the distortion estimation in FRUC evaluation in steps 1408 and 1409. When both templates contain high frequencies, they are both used in the FRUC evaluation. When no template contains high frequencies, the up template is selected in step 1411 to be used for the distortion estimation.

All these embodiments may be combined.

Figure 15:
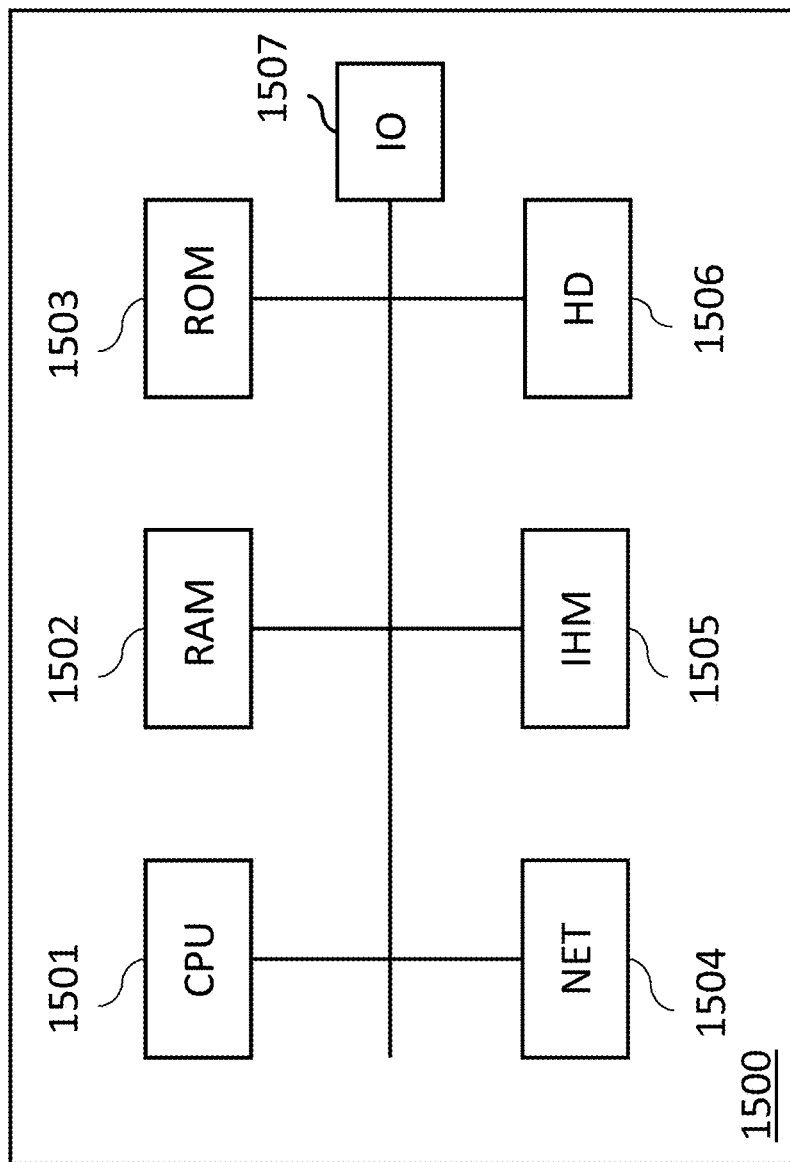
FIG. 15 is a schematic block diagram of a computing device for implementation of one or more embodiments of the invention.

FIG. 15 is a schematic block diagram of a computing device 1500 for implementation of one or more embodiments of the invention. The computing device 1500 may be a device such as a micro-computer, a workstation or a light portable device. The computing device 1500 comprises a communication bus connected to:
- a central processing unit 1501, such as a microprocessor, denoted CPU;
- a random access memory 1502, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 1503, denoted ROM, for storing computer programs for implementing embodiments of the invention;
- a network interface 1504 is typically connected to a communication network over which digital data to be processed are transmitted or received. The network interface 1504 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1501;
- a user interface 1505 may be used for receiving inputs from a user or to display information to a user;
- a hard disk 1506 denoted HD may be provided as a mass storage device;
- an I/O module 1507 may be used for receiving/sending data from/to external devices such as a video source or display.

The executable code may be stored either in read only memory 1503, on the hard disk 1506 or on a removable digital medium such as for example a disk. According to a variant, the executable code of the programs can be received by means of a communication network, via the network interface 1504, in order to be stored in one of the storage means of the communication device 1500, such as the hard disk 1506, before being executed.

The central processing unit 1501 is adapted to control and direct the execution of the instructions or portions of software code of the program or programs according to embodiments of the invention, which instructions are stored in one of the aforementioned storage means. After powering on, the CPU 1501 is capable of executing instructions from main RAM memory 1502 relating to a software application after those instructions have been loaded from the program ROM 1503 or the hard-disc (HD) 1506 for example. Such a software application, when executed by the CPU 1501, causes the steps of the flowcharts of the invention to be performed.

Any step of the algorithm of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for decoding video data comprising frames, each frame being split into blocks, the method for decoding comprising:
   determining first and second motion vectors for a block to be decoded in a frame to be decoded, the first motion vector specifying a first area in a first frame different from the frame to be decoded, and the second motion vector specifying a second area in a second frame different from the frame to be decoded;
   determining, by using at least one of signal content of the first area and signal content of the second area, whether to perform refinement for the first and second motion vectors in the method for decoding, in a case where a mode in which the refinement for the first and second motion vectors is capable of being performed is used in the method for decoding, wherein signal content of the block to be decoded is not used to determine whether to perform the refinement;
   wherein in a case where it is determined that the refinement is performed, performing the refinement for the first and second motion vectors to generate refined first and second motion vectors at sub-pixel accuracy; and
   wherein in a case where the refinement is performed, decoding the block to be decoded using the refined first and second motion vectors;
   wherein a plurality of patterns for refining is capable of being used in the mode in the method for decoding;
   wherein the plurality of patterns includes a horizontal pattern and a vertical pattern,
   wherein, when using the horizontal pattern, a plurality of horizontal sub-pixel positions on the right of a position to be refined and a plurality of horizontal sub-pixel positions on the left of the position to be refined are candidates of a horizontal position of the refined motion vector,
   wherein, when using the vertical pattern, a plurality of vertical sub-pixel positions above the position to be refined and a plurality of vertical sub-pixel positions below the position to be refined are candidates of a vertical position of the refined motion vector,
   wherein, the refinement for the first and second motion vectors is capable of including first refinement and second refinement which is performed after the first refinement.

2. The method of claim 1, wherein the refined first and second motion vectors are at 1/16 sub-pixel accuracy.

3. An apparatus for decoding video data comprising frames, each frame being split into blocks, the apparatus for decoding video data comprising one or more processors configured to decode a block of pixels by:
   determining first and second motion vectors for a block to be decoded in a frame to be decoded, the first motion vector specifying a first area in a first frame different from the frame to be decoded, and the second motion vector specifying a second area in a second frame different from the frame to be decoded;
   determining, by using at least one of signal content of the first area and signal content of the second area, whether to perform refinement for the first and second motion vectors in the method for decoding, in a case where a mode in which the refinement for the first and second motion vectors is capable of being performed is used in the method for decoding, wherein signal content of the block to be decoded is not used to determine whether to perform the refinement;
   wherein in a case where it is determined that the refinement is performed, performing the refinement for the first and second motion vectors to generate refined first and second motion vectors at sub-pixel accuracy; and
   wherein in a case where the refinement is performed, decoding the block to be decoded using the refined first and second motion vectors;
   wherein a plurality of patterns for refining is capable of being used in the mode in the method for decoding;
   wherein the plurality of patterns includes a horizontal pattern and a vertical pattern,
   wherein, when using the horizontal pattern, a plurality of horizontal sub-pixel positions on the right of a position to be refined and a plurality of horizontal sub-pixel positions on the left of the position to be refined are candidates of a horizontal position of the refined motion vector,
   wherein, when using the vertical pattern, a plurality of vertical sub-pixel positions above the position to be refined and a plurality of vertical sub-pixel positions below the position to be refined are candidates of a vertical position of the refined motion vector, wherein, the refinement for the first and second motion vectors is capable of including first refinement and second refinement which is performed after the first refinement.

4. The apparatus of claim 3, wherein the refined first and second motion vectors are at 1/16 sub-pixel accuracy.

5. A non-transitory computer-readable storage medium storing instructions of a computer program for implementing a method for decoding video data comprising frames, each frame being split into blocks, the method for decoding comprising:

determining first and second motion vectors for a block to be decoded in a frame to be decoded, the first motion vector specifying a first area in a first frame different from the frame to be decoded, and the second motion vector specifying a second area in a second frame different from the frame to be decoded;

determining, by using at least one of signal content of the first area and signal content of the second area, whether to perform refinement for the first and second motion vectors in the method for decoding, in a case where a mode in which the refinement for the first and second motion vectors is capable of being performed is used in the method for decoding, wherein signal content of the block to be decoded is not used to determine whether to perform the refinement;

wherein in a case where it is determined that the refinement is performed, performing the refinement for the first and second motion vectors to generate refined first and second motion vectors at sub-pixel accuracy; and wherein in a case where the refinement is performed, decoding the block to be decoded using the refined first and second motion vectors;

wherein a plurality of patterns for refining is capable of being used in the mode in the method for decoding;

wherein the plurality of patterns includes a horizontal pattern and a vertical pattern, wherein, when using the horizontal pattern, a plurality of horizontal sub-pixel positions on the right of a position to be refined and a plurality of horizontal sub-pixel positions on the left of the position to be refined are candidates of a horizontal position of the refined motion vector, wherein, when using the vertical pattern, a plurality of vertical sub-pixel positions above the position to be refined and a plurality of vertical sub-pixel positions below the position to be refined are candidates of a vertical position of the refined motion vector, wherein, the refinement for the first and second motion vectors is capable of including first refinement and second refinement which is performed after the first refinement.

* * * * *